H. P. MOTTOLA.
LOCK FOR AUTOMOBILE STEERING GEARS.
APPLICATION FILED APR. 27, 1917.
1,277,994. Patented Sept. 3, 1918.
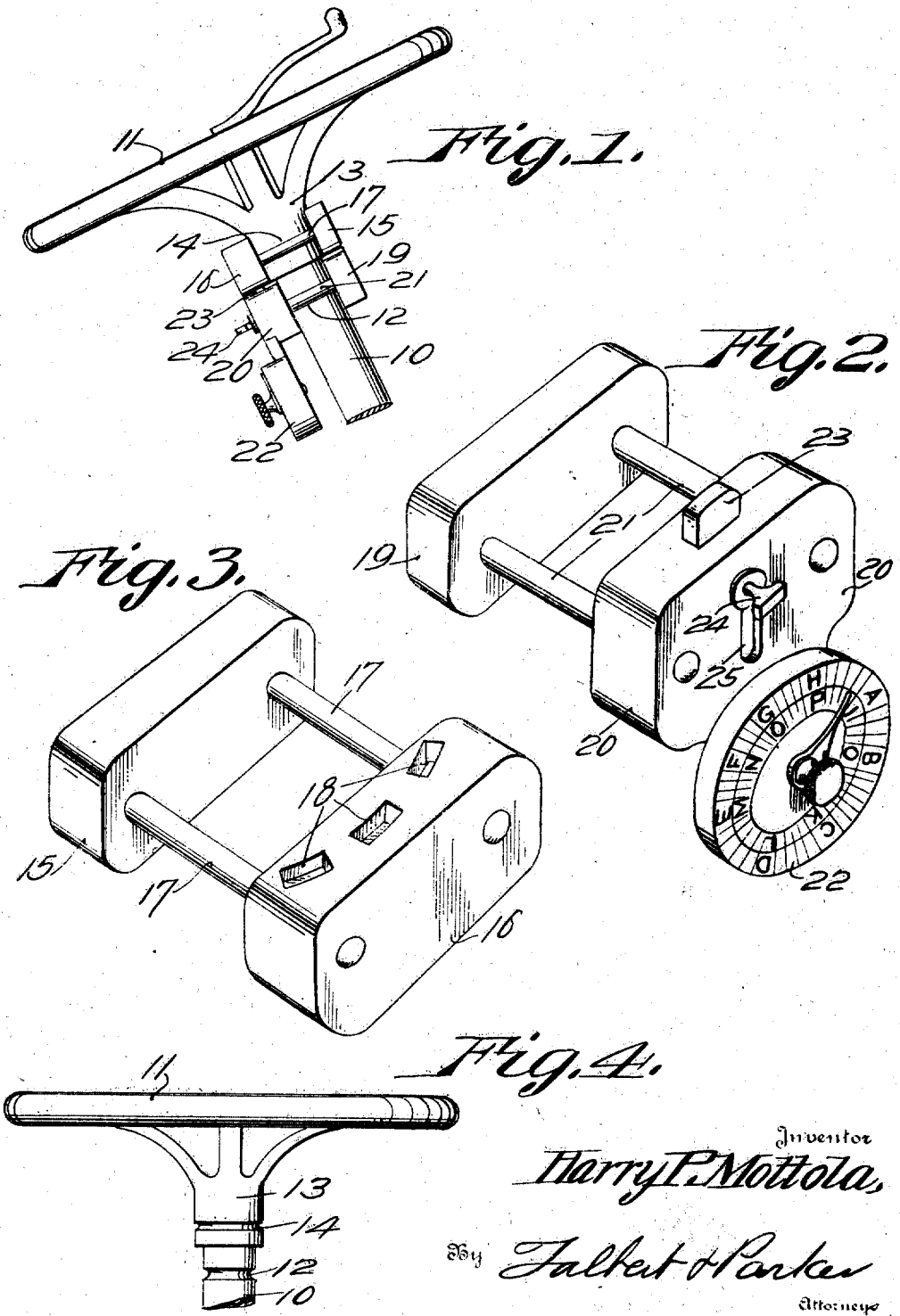
Inventor
Harry P. Mottola,
By Talbert & Parker
Attorneys

UNITED STATES PATENT OFFICE.

HARRY P. MOTTOLA, OF HAMMONTON, NEW JERSEY

LOCK FOR AUTOMOBILE STEERING-GEARS.

1,277,994.  Specification of Letters Patent.  Patented Sept. 3, 1918.

Application filed April 27, 1917. Serial No. 164,926.

*To all whom it may concern:*

Be it known that I, HARRY P. MOTTOLA, a citizen of the United States, residing at Hammonton, in the county of Atlantic and State of New Jersey, have invented certain useful Improvements in Locks for Automobile Steering-Gears, of which the following is a specification, reference being had therein to the accompanying drawing.

The present invention relates to an improved lock, particularly adapted for application to the steering gear of automobiles, and has for a primary object to provide a device which may be readily applied to the steering gears which are already in use.

Another object of the present invention is to provide a two-part lock adapted to be secured, one part to the steering shaft or wheel, which turns, and the other part to the stationary steering column, means being provided for inter-locking these two parts in various positions, so as to hold the steering wheel from turning after it is locked.

A further object of the invention is to provide a lock of this nature which is relatively small, occupies but little space, and may be readily set and released by the driver while occupying his seat.

The above, and other objects and advantages of this invention will be brought out in the following specific description of the present preferred embodiment, the same being illustrated in the accompanying drawing, wherein, Figure 1 is a side elevation of a steering gear having the improved lock applied thereto.

Fig. 2 is a perspective view of the lower lock part.

Fig. 3 is a similar view of the upper part.

Fig. 4 is a side elevation of a portion of the steering column and wheel, showing the grooves therein for the reception of the sides of the lock parts.

Referring to this drawing, 10 designates a steering column which, in the usual present day construction, is mounted rigidly upon a motor vehicle. The usual steering wheel 11 is mounted on the top of the steering column 10 and is adapted to turn thereon for operating the steering mechanism in the usual manner.

The steering column 10 is provided in opposite sides with parallel grooves 12, and the hub 13 of the steering wheel is provided on opposite sides with a pair of parallel grooves 14.

The movable part of the improved lock comprises a frame made up of opposed blocks 15 and 16, which are secured together at their ends by rivets 17, or the like, which are of a size adapted to fit into the grooves 14 of the steering wheel. These rivets 17 are adapted to fit snugly in the grooves and to hold the movable part of the lock from turning on the steering wheel.

The block 16 may be of any desired length, and is provided in its lower edge with a row of keeper openings 18.

The lower stationary part of the lock comprises the spaced apart plates 19 and 20, adapted to fit against the opposite sides of the steering column 10, and which are held rigidly thereagainst by rivets 21, or the like, adapted to engage in the grooves 12 of the steering car and to hold the lower part of the lock from turning on the steering column. Preferably, the parts of the lock project laterally toward the entrance side of the vehicle, so that access may be readily had thereto, and so that the permutation dial 22 may be observed by the operator in leaving and entering the vehicle. The plate 20 is provided with a sliding bolt 23 which projects upwardly from the plate and is adapted to enter the keeper openings 18 one at a time. The projection 24 is carried by the bolt 23 and extends through the plate 20 and is adapted to move in a slot 25 for extending and retracting the bolt 23. The lock is adapted to hold the bolt 23 in extended position, and to prevent the retraction of the bolt, unless the required combination be set on the dial of the lock.

The members 17 may of course be of other form than rivets, provided that they cannot be easily removed, and that they present a neat appearance.

The improved lock device may be readily applied to the steering gears now in use by merely grooving the steering column and the hub of the steering wheel in its opposite sides to receive the rivets 17, and by then applying the parts of the lock and riveting or otherwise securing the retaining members 17. The front plate or block 16 of the movable part is provided with a row of keeper openings to permit the locking of the steering wheel when turned into various angles, such as when it is desired to stop the vehicle with the road steering wheels turned at an angle to the longitudinal axis of the vehicle.

It is of course understood that various changes and modifications may be made in the above specifically described construction without departing from the spirit of this invention, and being restricted only by the scope of the following claim.

What is claimed is:—

The combination with a steering column having opposed transverse grooves in the upper surface thereof, a steering wheel rotatable with respect to the column and formed on the outer surface of its depending hub portion with opposed grooves, of a frame embodying spaced blocks, one of which is formed with an arcuate series of spaced keeper openings in the under surface thereof, spaced parallel fasteners rigidly connecting the blocks in spaced relation with each other for holding the blocks upon opposite sides of the wheel, the fasteners being seated in the grooves in the wheel, another frame embodying spaced blocks one of which is formed with a slot which opens at the upper and outer faces of the block, spaced parallel fasteners connecting the blocks in spaced parallel relation with each other and for holding the blocks on opposite sides of the column, the last mentioned fasteners being seated in the grooves in the column, a locking bolt slidable in the slot in the block and projecting through the end which opens at the upper surface of the block so as to removably engage with any one of the keeper openings, a finger projection connected with the bolt and slidable through that end of the slot which opens at the outer face of the block, and a permutation lock carried with the slotted block for holding the bolt in an extended position.

In testimony whereof I affix my signature.

HARRY P. MOTTOLA.